March 26, 1946.  W. B. LAWRENCE  2,397,277
TRACTION DEVICE
Filed July 30, 1943  3 Sheets-Sheet 1

Inventor
Walter B. Lawrence

By Clarence A. O'Brien
and Harvey B. Jacobson
Attorneys

March 26, 1946. W. B. LAWRENCE 2,397,277
TRACTION DEVICE
Filed July 30, 1943 3 Sheets-Sheet 2

Inventor
Walter B. Lawrence

By Clarence A. O'Brien
and Harvey B. Jacobson
Attorneys

March 26, 1946. W. B. LAWRENCE 2,397,277
TRACTION DEVICE
Filed July 30, 1943 3 Sheets-Sheet 3

Inventor
Walter B. Lawrence

By
Clarence A. O'Brien
and Harvey B. Jacobson
Attorneys

Patented Mar. 26, 1946

2,397,277

UNITED STATES PATENT OFFICE 2,397,277

TRACTION DEVICE

Walter B. Lawrence, St. John's, Newfoundland

Application July 30, 1943, Serial No. 496,799

3 Claims. (Cl. 152—218)

The present invention relates to new and useful improvements in traction devices and has for its primary object to provide, in a manner as hereinafter set forth, a device of this character which is adapted to be expeditiously mounted for use on the wheels of motor vehicles, farm tractors, etc.

Another very important object of the invention is to provide a traction device of the aforementioned character which is adapted to rotate or "creep" relative to the wheel on which it is mounted when in use.

Other objects of the invention are to provide a traction device of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein.

Figure 1:
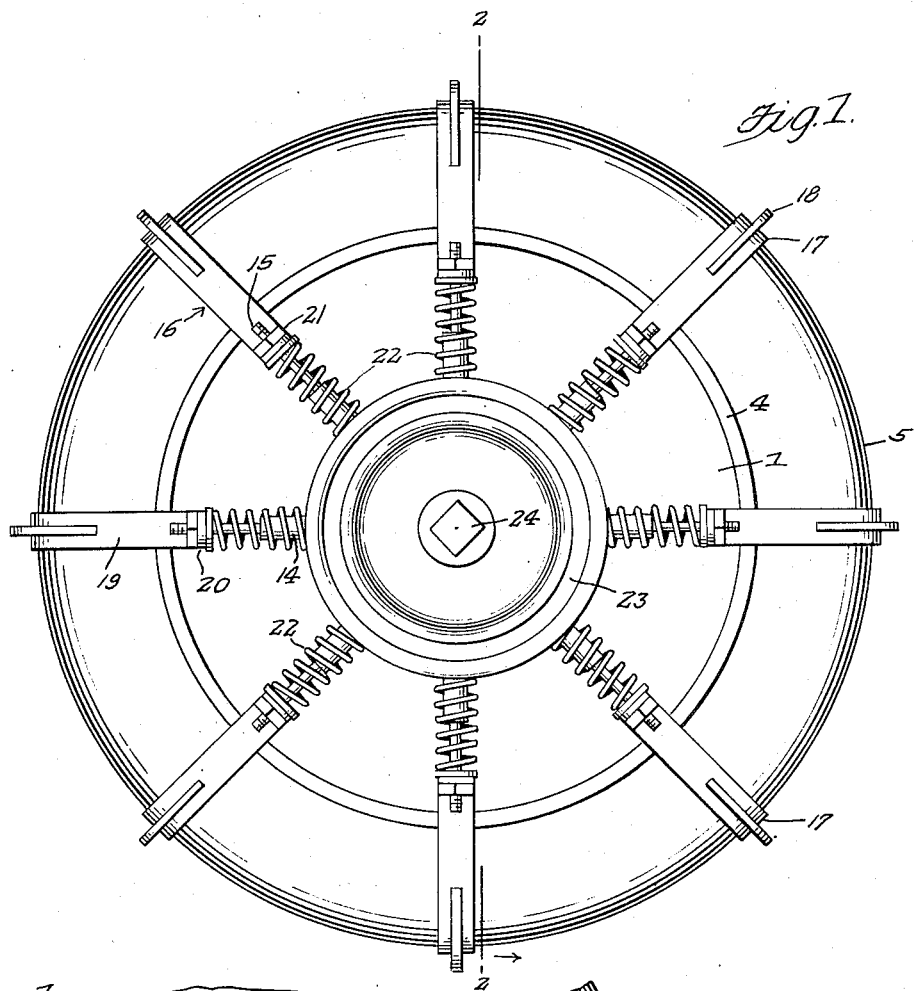
Figure 1 is a view in side elevation, showing a traction device constructed in accordance with the present invention mounted on a wheel.
Figure 4:
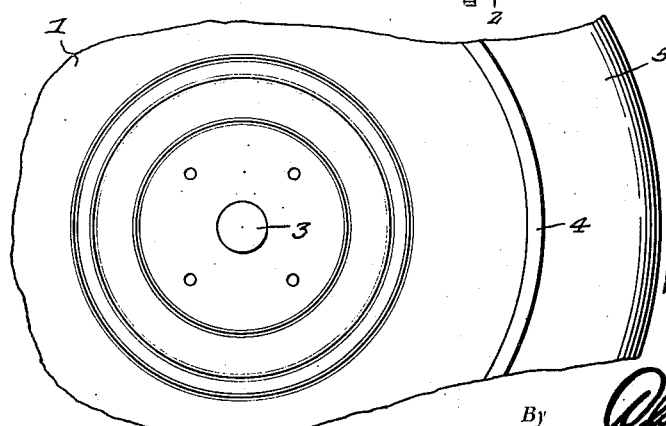
Figure 4 is a view in side elevation of a portion of the wheel on which the traction device is mounted.
Figure 2:
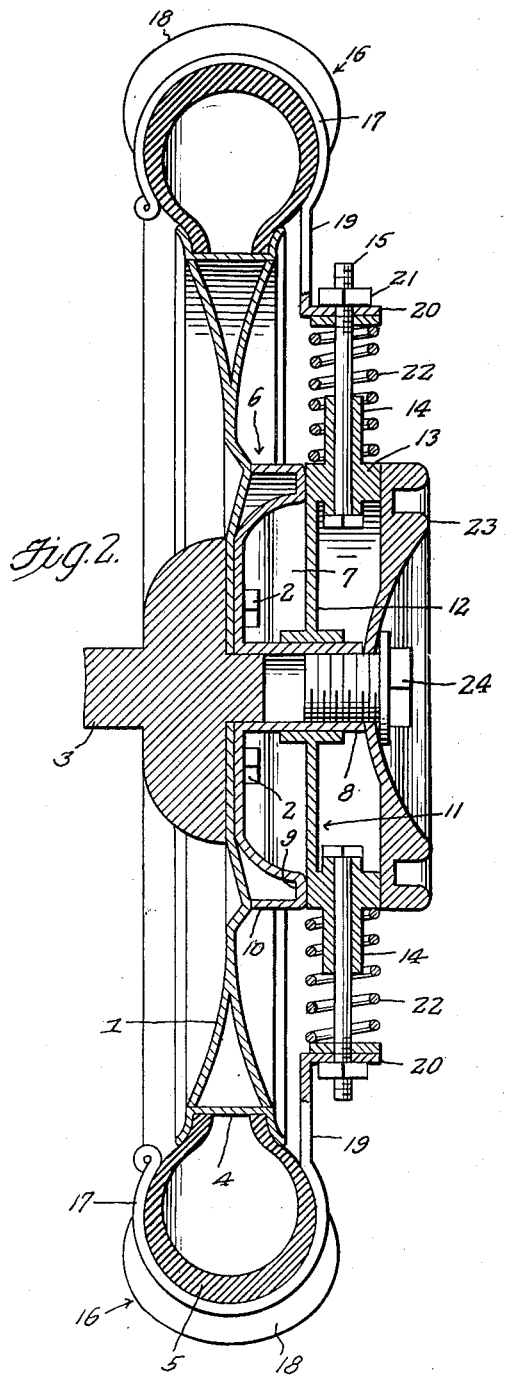
Figure 2 is a vertical sectional view, taken substantially on the line 2—2 of Figure 1.

Referring now to the drawings in detail, it will be seen that reference numeral 1 designates a disk wheel which is removably secured by bolts 2 to an axle 3. The wheel 1 carries a rim 4 having mounted thereon a pneumatic tire 5.

Mounted centrally on the wheel 1, on the outer side thereof, is a removable carrier 6. The carrier 6 includes an apertured, substantially bowl-shaped disk 7 which is secured to the wheel 1 by the bolts 2. A tubular hub 8 projects from the central portion of the disk 7. On its periphery, the substantially bowl-shaped disk 7 is provided with a flat ring 9 having an annular flange 10 thereon which abuts the wheel 1.

A drum 11 is rotatably and removably mounted on the carrier 6. The drum 11 includes a disk 12 which is journaled on the hub 8. Formed integrally with the peripheral portion of the disk 12 is a ring 13. Radial tubular guides 14 are formed integrally with the ring 13.

Rods or bolts 15 are slidable in the guides 14. Traction members 16 are slidably and adjustably mounted on the bolts 15. The traction members 16 comprise hooks 17 which are engageable transversely on the pneumatic tire 5, said hooks including cleats or lugs 18. The shanks 19 of the hooks 17 terminate in out-turned end portions 20 which are slidable on the bolts 15. Adjusting and retaining nuts 21 for the hooks 17 are threaded on the outer end portions of the bolts 15. Coil springs 22 encircle the bolts 15 for yieldingly urging the hooks 17 outwardly or away from the tire 5.

Removably mounted on the hub 8 is a retaining disk or plate 23 for the drum 11. The hub 8 is internally threaded to receive a screw 24 which secures the disk 23 in position. It will thus be seen that the drum 11 is rotatable between the disks 7 and 23.

Figure 6:
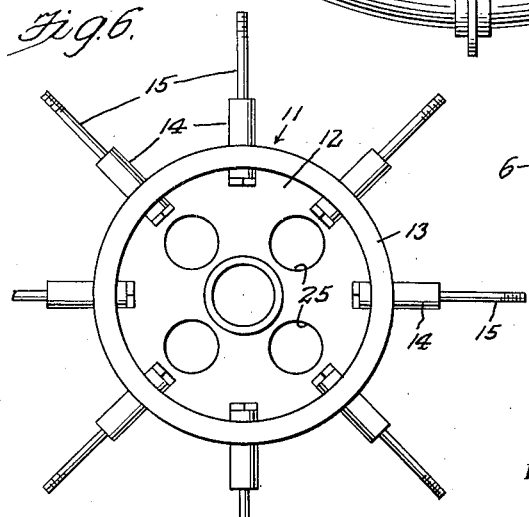
Figure 6 is a view in side elevation of the rotary member and the radiating rods or bolts which are slidable thereon.
Figure 5:
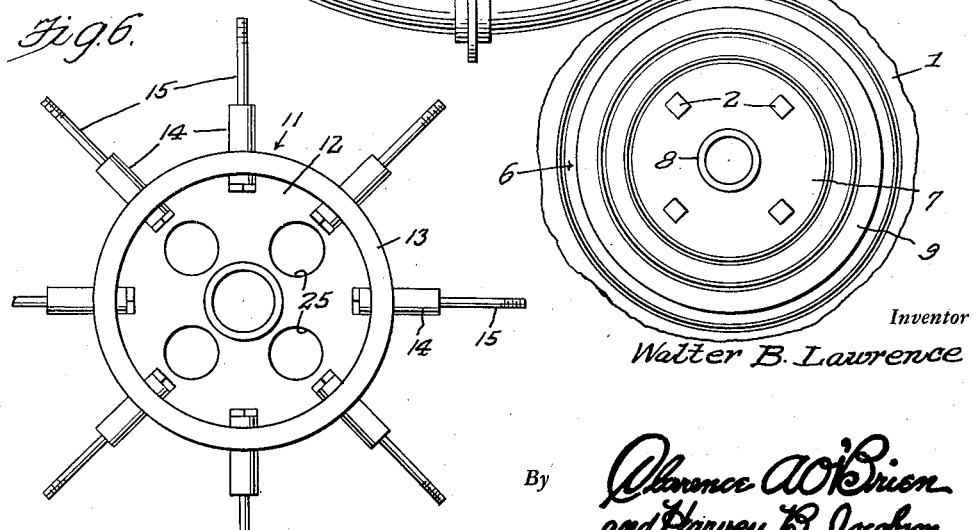
Figure 5 is a view in side elevation, showing the carrier mounted on the wheel, the central portion only of said wheel being shown.

It is thought that the operation of the device will be readily apparent from a consideration of the foregoing. Briefly, as the members 16 contact the surface over which the wheel 1 is traveling, said members are forced inwardly under the load against the tension of the coil springs 22. As the wheel is driven over the ground, the members 16 rotate or "creep" around the tire 5. This tendency to creep is increased as the speed of rotation of the wheel increases. Adjustment of the members 16 relative to the tire 5 may be readily had through the medium of the nuts 21. The disk 12 has formed therein a plurality of openings 25 (see Fig. 6) whereby access may be conveniently had to the bolts 2 when desired, after the disk 23 has been removed.

Figure 7:
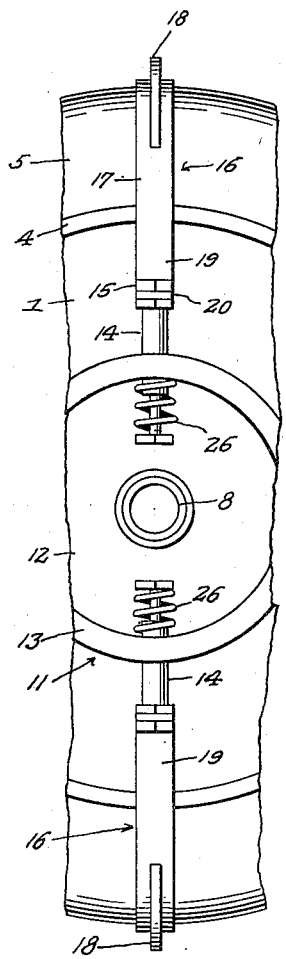
Figure 7 is a fragmentary view in side elevation, showing a slight modification.
Figure 3:
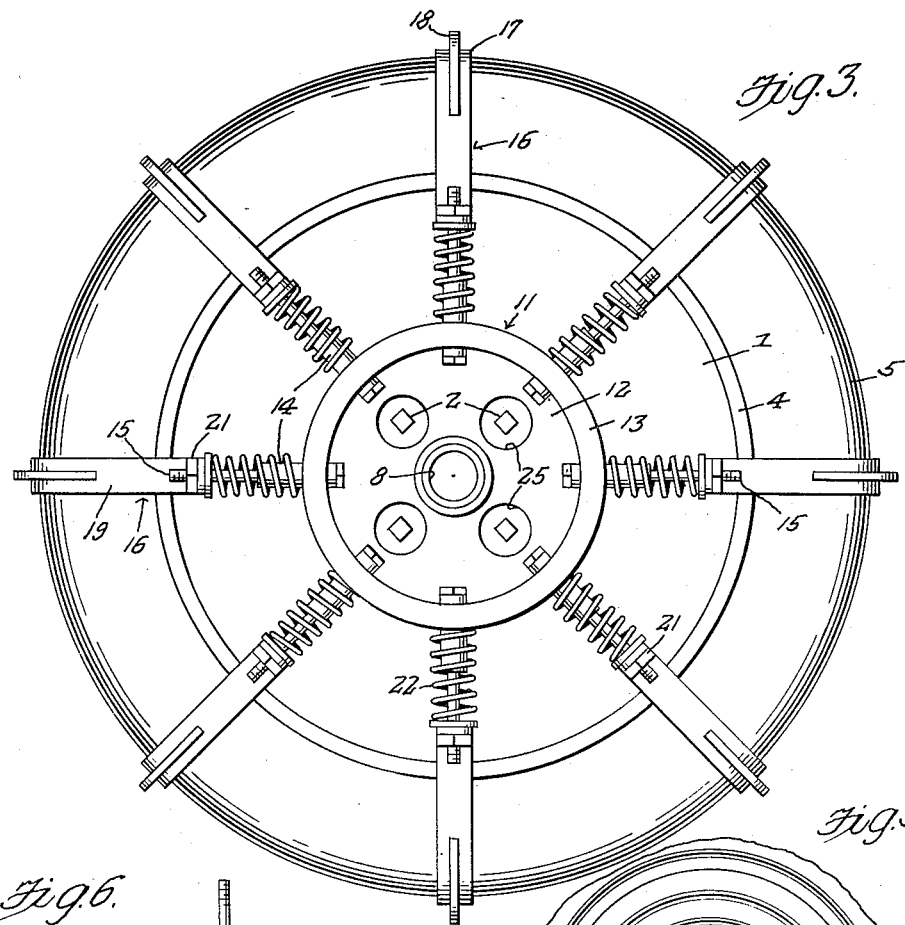
Figure 3 is a side elevational view similar to Figure 1 but with the retaining plate or disk removed.

In the slight modification illustrated in Figure 7 of the drawings, coil springs 26 are mounted on the bolts 15 on the inside of the ring 13. This arrangement of the coil springs 26 pulls the traction members 16 inwardly on the tire 5. In other respects this form of the invention is substantially similar in construction and operation to the embodiment illustrated in Figures 1 to 6, inclusive, of the drawings.

It is believed that the many advantages of a traction device constructed in accordance with the present invention will be readily understood and although preferred embodiments of said device are as illustrated and described, it is to be understood that further modifications and changes in the details of construction may be resorted to which will fall within the scope of the invention as claimed.

What is claimed is:

1. A traction device for wheels having a tire mounted thereon comprising, a substantially bowl-shaped disk removably mounted centrally on the wheel, a hub projecting laterally from said disk, a drum journaled on the hub, a retaining plate for the drum removably mounted on the hub, slidable bolts mounted radially on the drum, traction members slidable on the bolts and engageable with the tire, and coil springs encircling the bolts for yieldingly resisting movement of the traction members in one direction, said bowl-shaped disc and retaining plate forming side guides between which the drum is rotatably confined.

2. A traction device for wheels having a tire thereon comprising, a carrier including a substantially bowl-shaped disk removably mounted centrally on the wheel, a ring on the periphery of the disk, a tubular hub projecting laterally from the disk, a drum journaled on the hub, a retaining disk engaged with the drum, a securing bolt for said retaining disk threadedly mounted in the tubular hub, said drum being rotatable between said retaining disk and the ring, slidable bolts mounted radially on the drum, traction members slidably mounted on the bolts and including hooks engageable transversely with the tire, and coil springs encircling the bolts for yieldingly resisting movement of the traction members in one direction, said ring and disc-forming side guides between which said drum is rotatably confined.

3. A traction device for wheels having a tire thereon comprising, a substantially bowl-shaped disk removably mounted on the wheel, a hub projecting laterally from the disk, a drum journaled on the hub, said drum including a disk and a ring on the second-named disk, a retaining disk for the drum removably mounted on the hub, slidable rods mounted radially on the ring, traction members slidably mounted on the rods and including hooks engageable with the tire, and coil springs encircling the bolts between the ring and the traction members for yieldingly urging said traction members outwardly, said bowl-shaped disc and retaining disc forming side guides between which said drum is rotatably confined.

WALTER B. LAWRENCE.